(12) United States Patent
Bates et al.

(10) Patent No.: US 6,931,110 B2
(45) Date of Patent: Aug. 16, 2005

(54) SYSTEM AND METHOD FOR IMPLEMENTING CALLING CARD SECURITY AND SECURED CALLING CARD

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 09/881,168

(22) Filed: Jun. 14, 2001

(65) Prior Publication Data

US 2002/0191763 A1 Dec. 19, 2002

(51) Int. Cl.[7] .............................................. H04M 15/00
(52) U.S. Cl. ............................. 379/144.01; 379/114.15; 379/114.17; 379/127.02; 379/127.05
(58) Field of Search ........................ 379/114.14, 114.15, 379/114.17, 114.18, 114.19, 114.27, 118, 127.02, 144.01, 145, 188, 189, 201.03, 114.03, 114.1, 127.05, 133

(56) References Cited

U.S. PATENT DOCUMENTS

| | | | | |
|---|---|---|---|---|
| 5,864,609 A | * | 1/1999 | Cross et al. | 379/115.01 |
| 5,875,236 A | * | 2/1999 | Jankowitz et al. | 379/114.01 |
| 5,946,380 A | * | 8/1999 | Cohen et al. | 379/127.01 |
| 5,988,497 A | * | 11/1999 | Wallace | 235/382.5 |
| 6,016,343 A | * | 1/2000 | Hogan et al. | 379/242 |
| 6,122,352 A | * | 9/2000 | Kangas et al. | 379/114.29 |
| 6,188,752 B1 | * | 2/2001 | Lesley | 379/114.01 |
| 6,195,422 B1 | * | 2/2001 | Jones et al. | 379/144.01 |
| 6,307,926 B1 | * | 10/2001 | Barton et al. | 379/189 |
| 6,324,271 B1 | * | 11/2001 | Sawyer et al. | 379/142.05 |

* cited by examiner

Primary Examiner—Quoc Tran
(74) Attorney, Agent, or Firm—Joan Pennington

(57) ABSTRACT

A computer implemented method, computer program product and system are provided for implementing calling card security. A telephone call request is received from a calling card user. A plurality of predefined options is checked to identify user selected options for the calling card. The telephone call request from the calling card user is processed responsive to the identified user selected options for the calling card. During calling card setup, the calling card user can selectively enable multiple predefined options for use of the calling card. The calling card user can selectively enable use of the calling card for one or more user specified telephone numbers, use of the calling card to a user specified limited area, use of the calling card with voice recognition, use of the calling card for a user specified limited number of calls from a specified telephone number; and use of the calling card for a user specified limited time duration for a call.

20 Claims, 6 Drawing Sheets

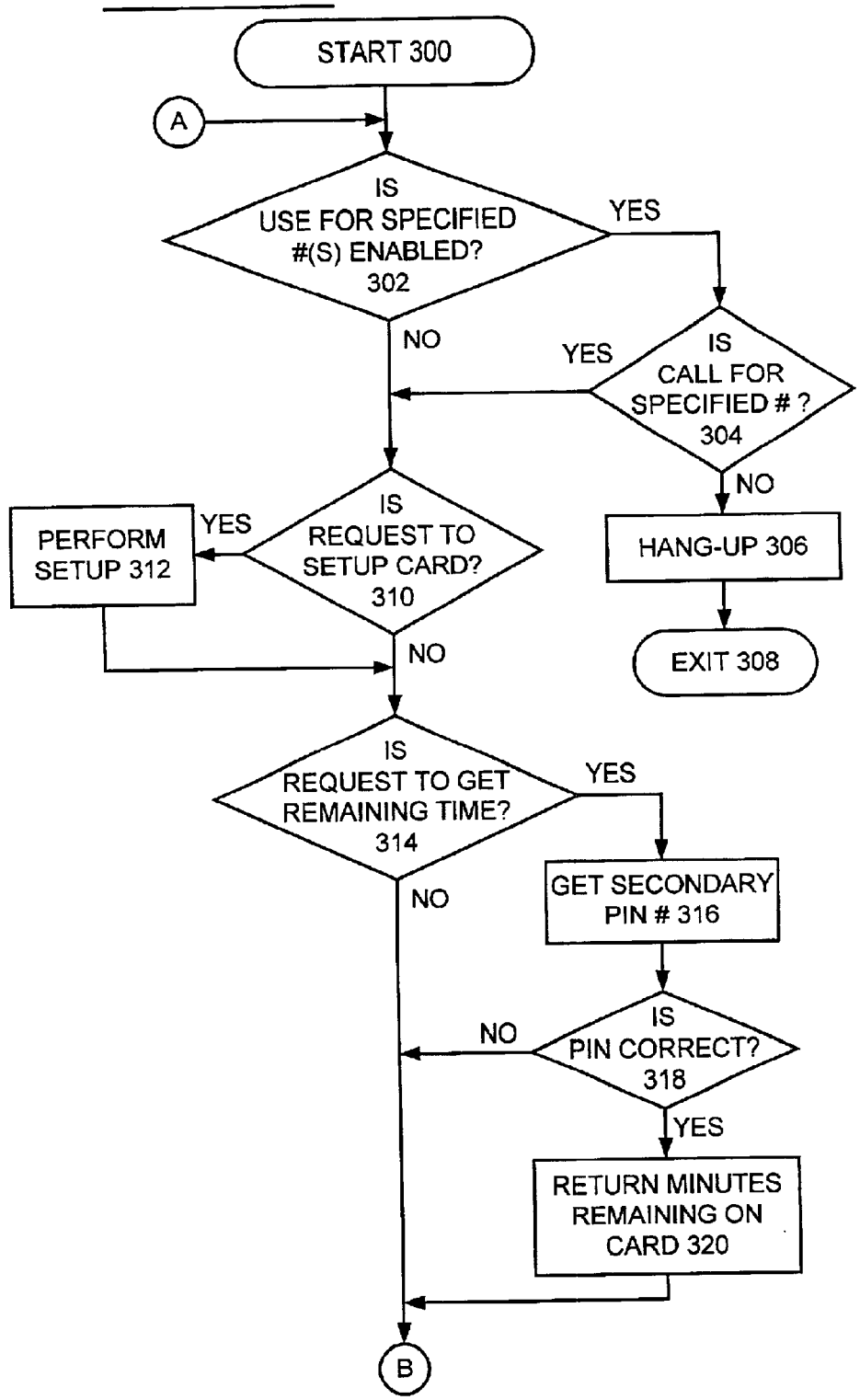

SYSTEM AND METHOD FOR IMPLEMENTING CALLING CARD SECURITY AND SECURED CALLING CARD

FIELD OF THE INVENTION

The present invention relates generally to the data processing field, and more particularly, relates to a method, computer program product and system for implementing calling card security.

DESCRIPTION OF RELATED ART

Today calling cards can be bought at stores and the only associated security with the cards is a personal identification (PIN) number. Once someone gets this PIN number the card is capable of being used by anyone and anywhere. Some calling cards include the PIN number on the calling card. If such a calling card is lost, then a person finding the card can use the card without any effort.

Also there have been and probably will always be people trying to steal PIN numbers. This is done through cameras at an airport or computers ripping through random numbers to try and find a valid number.

A need exists for a mechanism for implementing effective calling card security. It is desirable to provide a secured calling card without interfering with the desired use of the calling card. It is desirable to provide a mechanism for implementing effective calling card security with user selected security options.

SUMMARY OF THE INVENTION

A principal object of the present invention is to provide a method, computer program product and system for implementing calling card security. Other important objects of the present invention are to provide such method, computer program product and system for implementing calling card security substantially without negative effect and that overcome many of the disadvantages of prior art arrangements.

In brief, a computer implemented method, computer program product and system are provided for implementing calling card security. A telephone call request is received from a calling card user. A plurality of predefined options is checked to identify user selected options for the calling card. The telephone call request from the calling card user is processed responsive to the identified user selected options for the calling card.

In accordance with features of the invention, during calling card setup, the calling card user can selectively enable multiple predefined options for use of the calling card. The calling card user can selectively enable use of the calling card for one or more user specified telephone numbers, use of the calling card to a user specified limited area, use of the calling card with voice recognition, use of the calling card for a user specified limited number of calls from a specified telephone number; and use of the calling card for a user specified limited time duration for a call.

BRIEF DESCRIPTION OF THE DRAWINGS

The present invention together with the above and other objects and advantages may best be understood from the following detailed description of the preferred embodiments of the invention illustrated in the drawings, wherein:

FIGS. 3A, 3B, and 3C are flow charts illustrating exemplary steps for implementing calling card security in accordance with the preferred embodiment.

DETAILED DESCRIPTION OF THE PREFERRED EMBODIMENTS

Figure 1A:
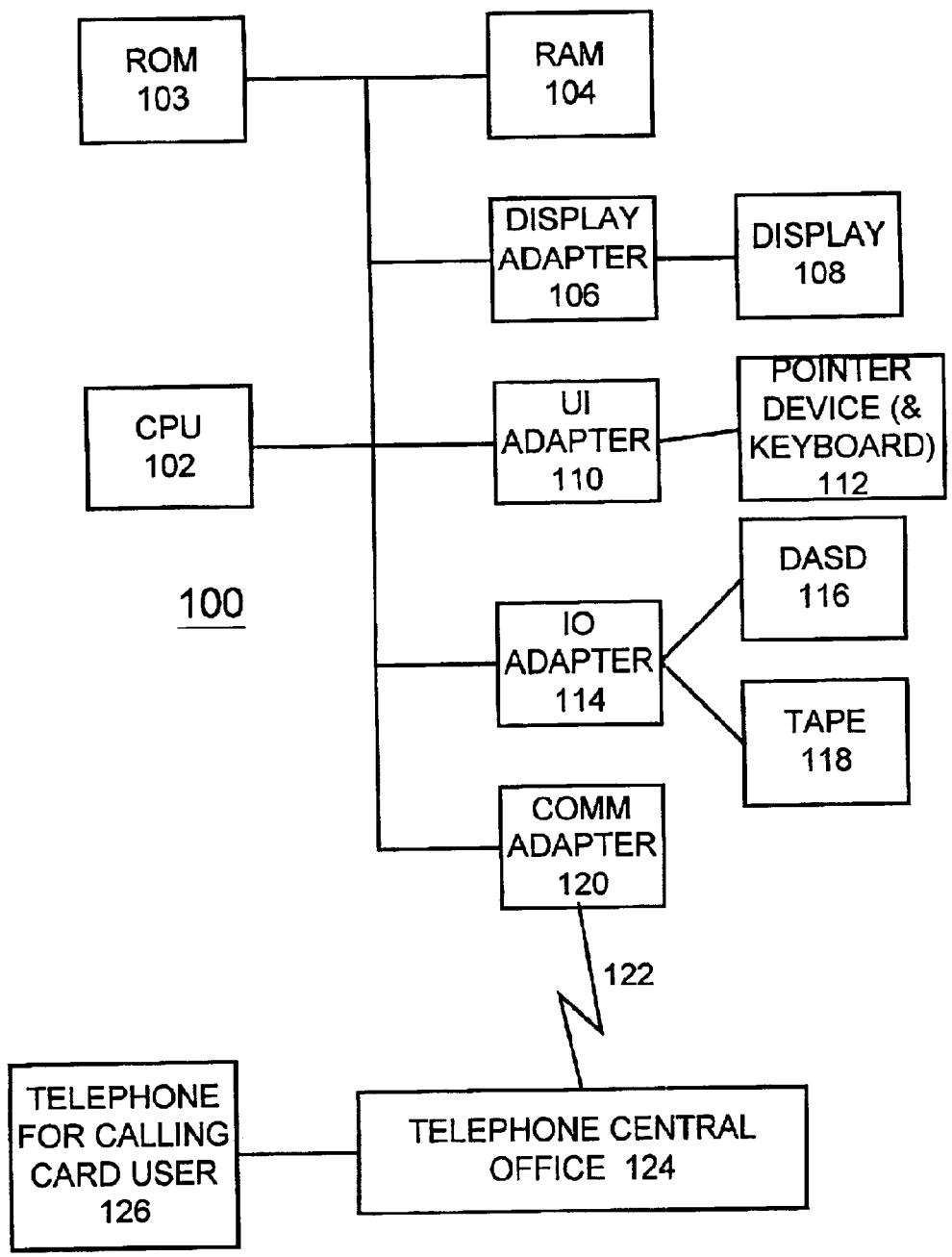
FIGS. 1A and 1B are block diagram representations illustrating a server computer system and operating system for implementing calling card security in accordance with the invention.
Figure 1B:
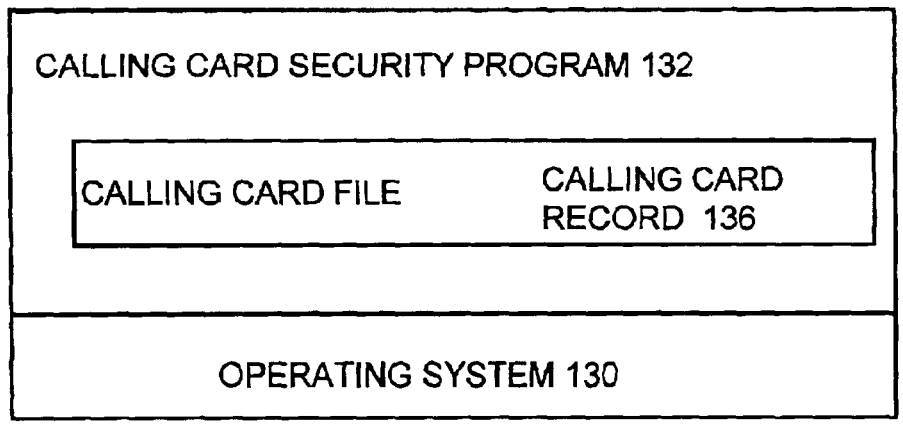

Having reference now to the drawings, in FIGS. 1A and 1B, there is shown a server computer system generally designated by the reference character 100 for carrying out the methods for implementing calling card security of the preferred embodiment. As shown in FIG. 1A, server computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (10) adapter 114 connected to a direct access storage device (DASD) 116 and a tape unit 118. CPU 102 is connected to a communications adapter 120 providing a communications function. Communications adapter 120 is connected via a communications link 122 to a telephone central office 124. A telephone 126 for a calling card user is connected to the server computer 100 via the telephone central office 124. POTS (plain old telephone service) can be used between the telephone 126 and the central office 124 and between the server computer 100 and the central office 124. It should be understood that the present invention is not limited to a computer model with a single CPU, or other single component architectures as shown in FIG. 1A.

As shown in FIG. 1B, server computer system 100 includes an operating system 130 and a calling card security program 132 of the preferred embodiment. The server computer 100 in accordance with the calling card security methods of the preferred embodiment stores a calling card record 136 that can include multiple calling card user selected options.

Various commercially available computers can be used for the server computer system 100, for example, an IBM personal computer. CPU 102 is suitably programmed by the calling card security program 132 to execute the flowcharts of FIGS. 3A, 3B, and 3C of the preferred embodiment.

In accordance with features of the preferred embodiment, the calling card purchaser is provided with multiple security options that can be setup and used with a calling card. The user can set up the security options using a standard telephone from various locations, for example, in the comfort of the user's home. The user is given more security choices without interfering with the convenient use of the calling card. The security features are optional and used on a requested basis by the calling card user.

In accordance with features of the preferred embodiment, multiple features are made available to the calling card user. A personal identification (PIN) number or calling card number can be enabled to only work from a specific telephone number and/or to a specific telephone number. This provides significant value since some calling card users only want to use the calling card for making or receiving long distance calls at their main residence. Voice recognition software can be enabled to determine if a call should be allowed. The PIN number or calling card number can be enabled to only work with a finite set of numbers, for example, to share the card with family members at different residents. The PIN number or calling card number can be enabled to only work with certain area codes, area codes could be set up to cover entire states or regions. The PIN number or calling card number can be enabled to only work with certain geographical regions, for example, only at the Minneapolis airport. Call duration can be limited; for example to 5 minutes and then the telephone functions as through you have run out of minutes on the card. The number of calls made from any specified telephone number can be limited. The number of calls from any one area code, region, and the like can be limited. This is useful for business travel and travel in general.

Figure 2:
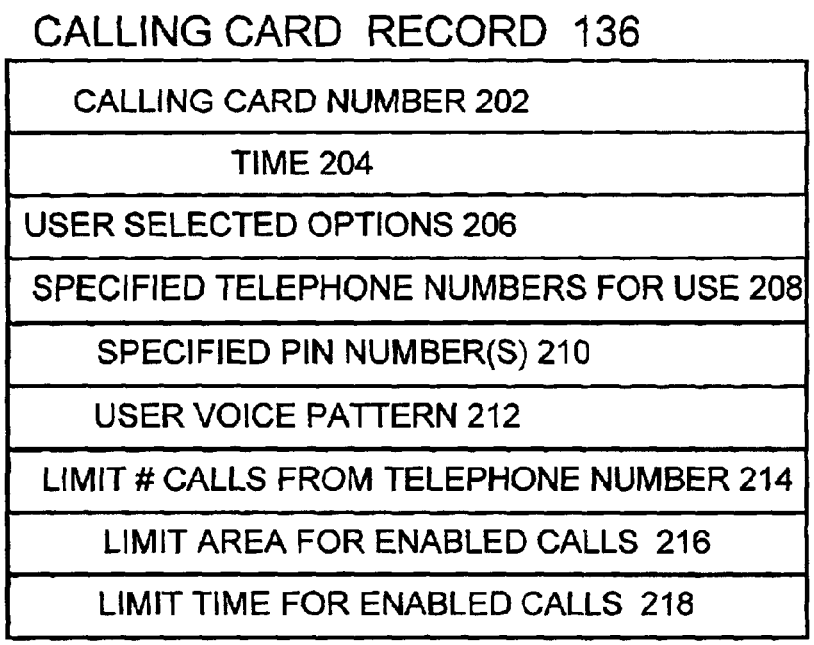
FIG. 2 is a diagram illustrating a calling card record in accordance with the preferred embodiment.

FIG. 2 illustrates the calling card record 136 in accordance with the preferred embodiment. Server computer 100 stores the calling card record 136 that includes a calling card number 202 and a time remaining 204 for the calling card. The calling card record 136 includes multiple user selected options 206 including specified telephone numbers for use 208, specified PIN numbers 210, user voice pattern 212, limit number of calls from a particular telephone number 214, limit area for enabled calls 216, and limit time duration for enabled calls 218. The calling card user can select any of the multiple user selected options 206.

Figure 3B:
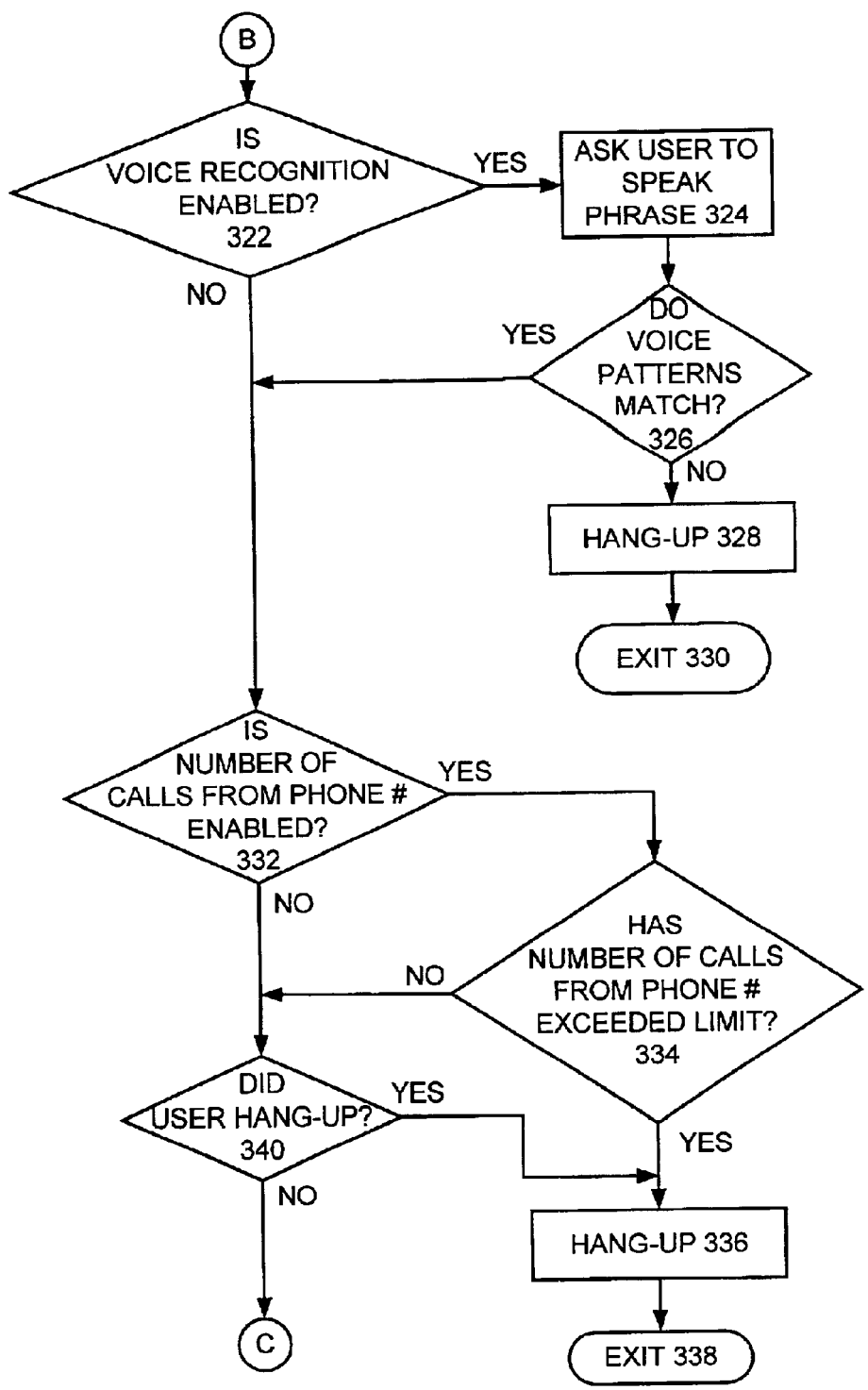
Figure 3C:
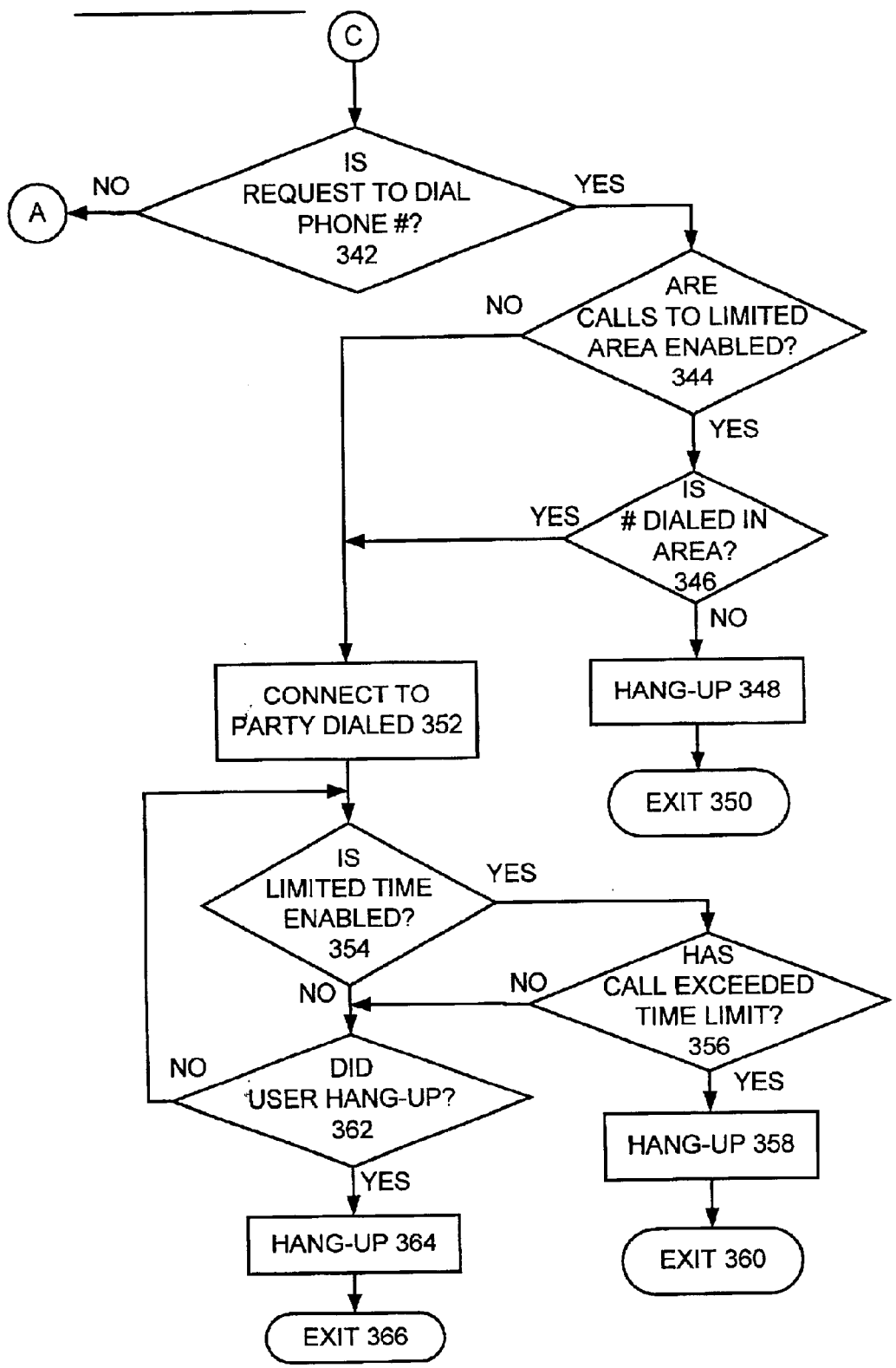

FIGS. 3A, 3B, and 3C illustrate exemplary steps performed by the server computer 100 for implementing calling card security and a secured calling card in accordance with the preferred embodiment. The sequential steps start at block 300 when the server computer 100 receives a telephone call from a calling card user. Checking whether use for a specified telephone number or specified telephone numbers is enabled is performed as indicated in a decision block 302. For example, user specified telephone numbers for use 208 can limit the use of the calling card for specified telephone numbers for either or both originating and called telephone numbers. When use for a specified telephone number or specified telephone numbers is enabled, checking whether the call is for a specified telephone number is performed as indicated in a decision block 304. If the call is not for a specified telephone number, then the call is terminated as indicated in a block 306 labeled hang-up and the sequence ends as indicated in a block 308.

Otherwise, if the call is from a specified telephone number or when use from a specified telephone number or specified telephone numbers is not enabled, then checking whether this is a request to setup card is performed as indicated in a decision block 310. If so, then setup is performed as indicated in a block 312 where user selected options 206 are received and stored in the calling card record 136 of FIG. 2. The calling card user can select any of the multiple user selected options 206. During the card setup, the calling card user can set multiple specified telephone numbers for use 208 so that calls will be blocks from any other telephone numbers and one or more specified PIN numbers 210 so that calls will be blocks and other information denied unless the specified PIN numbers are provided. During the card setup, the calling card user can provide the user voice pattern 212 so that calls will be blocks from any caller not providing the user voice pattern. The calling card user can set a limited number of calls from a particular telephone number 214. The calling card user can set a limited area for enabled calls 216, and a limited time for enabled calls 218.

Checking whether this is a request to get remaining time is performed as indicated in a decision block 314. If this is a request to get remaining time, then a secondary PIN number is obtained as indicated in a block 316. Checking whether the PIN number is correct is performed as indicated in a decision block 318. If the correct PIN number is found, then the minutes remaining on the calling card are returned as indicated in a block 320.

Referring to FIG. 3B, checking whether voice recognition is enabled is performed as indicated in a decision block 322. When voice recognition is enabled, the user is asked to speak a phrase as indicated in a block 324. Checking whether the spoken voice pattern matches the stored voice pattern 212 is performed as indicated in a decision block 326. If the voice patterns do not match, then the call is terminated as indicated in a block 328 and the sequence ends as indicated in a block 330.

When voice recognition is not enabled or after matching voice patterns are identified, checking whether the number of calls from a specified phone number is enabled as indicated in a decision block 332. When the number of calls from a specified phone number is enabled, checking whether the number of calls from this phone number exceeds a defined threshold limit as indicated in a decision block 334. When the number of calls from this phone number exceeds the defined threshold limit then the call is terminated as indicated in a block 336 and the sequence ends as indicated in a block 338. Otherwise when the number of calls from a specified phone number is not enabled or the number of calls from this phone number does not exceed the defined threshold limit, then checking whether for a user hang-up is performed as indicated in a decision block 340. When a user hang-up is identified, then the call is terminated at block 336 and the sequence ends at block 338.

Referring to FIG. 3C, when a user hang-up is not found, checking whether this is a request to dial a telephone number is performed as indicated in a decision block 342. When a request to dial a telephone number is not identified, then the sequential steps return to block 302 in FIG. 3A. When a request to dial a telephone number is identified, then checking whether calls to a limited area is enabled as indicated in a decision block 344. When calls to a limited area is enabled, checking if the telephone number dialed is within the limited area is performed as indicated in a decision block 346. When the telephone number dialed is not within the limited area, then the call is terminated as indicated in a block 348 and the sequence ends as indicated in a block 350. Otherwise, when calls to a limited area is not enabled or the telephone number dialed is within the limited area, then the call is connected to the telephone number dialed as indicated in a block 352.

Next, checking whether limited time is enabled is performed as indicated in a decision block 354. When limited time is enabled, checking whether the call has exceeded the time limit is performed as indicated in a decision block 356. When the call has exceeded the time limit, then the call is terminated as indicated in a block 358 and the sequence ends as indicated in a block 360.

Otherwise, when limited time is not enabled or the call has not exceeded the time limit, then checking for a user hang-up is performed as indicated in a decision block 362. If the user did hang-up, then the call is terminated as indicated in a block 364 and the sequence ends as indicated in a block 366. Otherwise, the sequential operations continue, returning to decision block 354 to check whether limited time is enabled.

Figure 4:
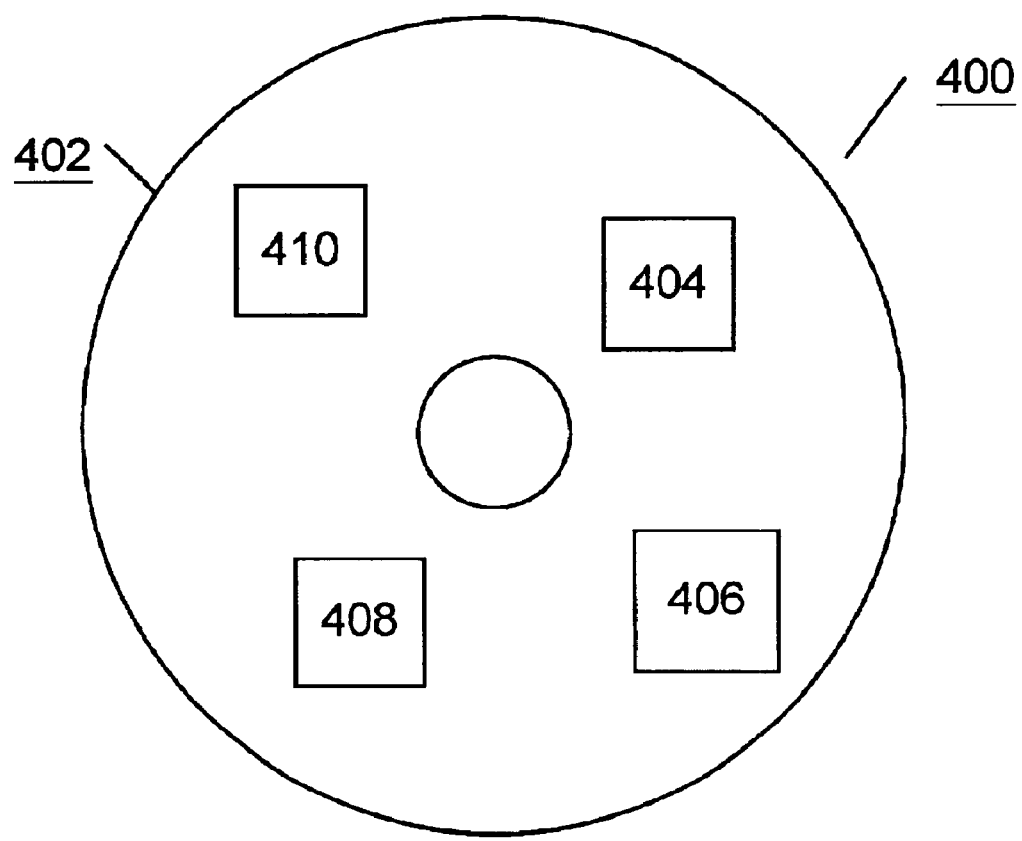
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods for implementing calling card security of the preferred embodiment in the server system 100 of FIG. 1.

A sequence of program instructions or a logical assembly of one or more interrelated modules defined by the recorded program means 404, 406, 408, 410, direct the server computer system 100 for implementing calling card security of the preferred embodiment.

While the present invention has been described with reference to the details of the embodiments of the invention shown in the drawing, these details are not intended to limit the scope of the invention as claimed in the appended claims.

What is claimed is:

1. A computer implemented method for implementing calling card security comprising the steps of:
   receiving a telephone call request from a calling card user;
   sequentially checking a plurality of predefined options to identify user selected options for the calling card using a stored calling card record, said calling card record storing a calling card number and a time remaining for the calling card; said calling card record including said plurality of predefined options and each said user selected options for the calling card; and
   processing said telephone call request from the calling card user responsive to said identified user selected options for the calling card.

2. A computer implemented method for implementing calling card security as recited in claim 1 includes the steps of identifying a telephone call request to setup a calling card from a calling card user and performing setup to receive and store user selected options for the calling card.

3. A computer implemented method for implementing calling card security as recited in claim 1 wherein the step of checking said plurality of predefined options to identify user selected options for the calling card includes the step of checking for use from a specified telephone number being enabled.

4. A computer implemented method for implementing calling card security as recited in claim 3 wherein the step of processing said telephone call request from the calling card user responsive to said identified user selected options for the calling card includes the step of checking for said telephone call request originating from a specified telephone number responsive to an identified use from a specified telephone number being enabled; and terminating said telephone call request responsive to said telephone call request not originating from said specified telephone number.

5. A computer implemented method for implementing calling card security as recited in claim 1 wherein the step of checking said plurality of predefined options to identify user selected options for the calling card includes the step of checking for voice recognition being enabled.

6. A computer implemented method for implementing calling card security as recited in claim 5 wherein the step of processing said telephone call request from the calling card user responsive to said identified user selected options for the calling card includes the step of requesting the calling card user to speak a phrase responsive to voice recognition being enabled; comparing a received voice pattern with a stored voice pattern; and terminating said telephone call request when a match of the voice patterns is not found.

7. A computer implemented method for implementing calling card security as recited in claim 1 wherein the step of checking said plurality of predefined options to identify user selected options for the calling card includes the step of checking for a limited number of calls from a specified telephone number being enabled.

8. A computer implemented method for implementing calling card security as recited in claim 7 wherein the step of processing said telephone call request from the calling card user responsive to said identified user selected options for the calling card includes the step of comparing a number of calls from said specified telephone number with a threshold limit responsive to said limited number of calls from a specified telephone number being enabled; and terminating said telephone call request when said number of calls from said specified telephone number exceeds said threshold limit.

9. A computer implemented method for implementing calling card security as recited in claim 1 wherein the step of checking said plurality of predefined options to identify user selected options for the calling card includes the step of checking for calls to a limited area being enabled.

10. A computer implemented method for implementing calling card security as recited in claim 9 wherein the step of processing said telephone call request from the calling card user responsive to said identified user selected options for the calling card includes the step of comparing a telephone number dialed with said limited area responsive to calls to said limited area being enabled; and terminating said telephone call request when said telephone number dialed is outside said limited area.

11. A computer implemented method for implementing calling card security as recited in claim 1 wherein the step of checking said plurality of predefined options to identify user selected options for the calling card includes the step of checking for a limited time for calls being enabled.

12. A computer implemented method for implementing calling card security as recited in claim 1 wherein the step of processing said telephone call request from the calling card user responsive to said identified user selected options for the calling card includes the step of comparing a call duration with said limited time responsive to said limited time for calls being enabled; and terminating said call when said limited time for calls is exceeded.

13. A computer program product for implementing calling card security with a server computer, said computer program product including a plurality of computer executable instructions stored on a computer readable medium, wherein said instructions, when executed by said server computer, cause the server computer to perform the steps of:
   responsive to a user request to setup a calling card, performing setup to receive and store user selected options for said calling card;
   receiving a telephone call request from a calling card user;
   responsive to said telephone call request from the calling card user, sequentially checking a plurality of predefined options to identify user selected options for the calling card using a stored calling card record, said calling card record storing a calling card number and a time remaining for the calling card; said calling card record including said plurality of predefined options and each said user selected options for the calling card; and
   processing said telephone call request from the calling card user responsive to said identified user selected options for the calling card.

14. A computer program product for implementing calling card security with a server computer as recited in claim 13 wherein the step responsive to said telephone call request from the calling card user, checking a plurality of predefined options to identify user selected options for the calling card includes the step of checking for a user specified telephone number for use of the calling card.

15. A computer program product for implementing calling card security with a server computer as recited in claim 13 wherein the step responsive to said telephone call request from the calling card user, checking a plurality of predefined options to identify user selected options for the calling card includes the step of checking for voice recognition being enabled by the calling card user to identify the calling card user for use of the calling card.

16. A computer program product for implementing calling card security with a server computer as recited in claim 13 wherein the step responsive to said telephone call request from the calling card user, checking a plurality of predefined options to identify user selected options for the calling card includes the step of checking for a limited area for calls being enabled by the calling card user for use of the calling card.

17. A computer program product for implementing calling card security with a server computer as recited in claim 13 wherein the step responsive to said telephone call request from the calling card user, checking a plurality of predefined options to identify user selected options for the calling card includes the step of checking for a limited number of calls from a specified area or a specified telephone number being enabled by the calling card user for use of the calling card.

18. A computer program product for implementing calling card security with a server computer as recited in claim 13 wherein the step responsive to said telephone call request from the calling card user, checking a plurality of predefined options to identify user selected options for the calling card includes the step of checking for a limited time duration for calls being enabled by the calling card user for use of the calling card.

19. A computer program product for implementing calling card security with a server computer as recited in claim 13 wherein the step of processing said telephone call request from the calling card user responsive to said identified user selected options for the calling card includes the step of comparing said identified user selected options for the calling card with said telephone call request from the calling card user and terminating the telephone call when said telephone call request differs from said identified user selected options for the calling card.

20. A system for implementing calling card security comprising:

a server computer;

a calling card security program including a plurality of computer executable instructions stored on a computer readable medium, wherein said instructions, when executed by said server computer, cause the server computer to perform the steps of:

receiving a telephone call request from a calling card user;

sequentially checking a plurality of predefined options to identify user selected options for the calling card using a stored calling card record, said calling card record storing a calling card number and a time remaining for the calling card; said calling card record including said plurality of predefined options and each said user selected options for the calling card; and processing said telephone call request from the calling card user responsive to said identified user selected options for the calling card.

\* \* \* \* \*

Disclaimer

6,931,110 — Cary Lee Bates, Rochester, MN (US); and John Matthew Santosuosso, Rochester, MN (US), SYSTEM AND METHOD FOR IMPLEMENTING CALLING CARD SECURITY AND SECURED CALLING CARD. Patent dated August 16, 2005. Disclaimer filed October 6, 2006, by the assignee, International Business Machines Corporation.

Hereby enters this disclaimer to all of the claims, of said patent.

*(Official Gazette, May 27, 2008)*